(12) United States Patent
Shah et al.

(10) Patent No.: US 7,860,903 B2
(45) Date of Patent: Dec. 28, 2010

(54) TECHNIQUES FOR GENERIC DATA EXTRACTION

(75) Inventors: Anish Shah, Apex, NC (US); Christian Seifert, Durham, NC (US); Scott Shelton, Apex, NC (US); David Brophy, Beaumaris (AU); David Carmer, Cary, NC (US); Jason Figge, Pittsboro, NC (US); Dan Willoughby, Raleigh, NC (US)

(73) Assignee: Teradata US, Inc., Dayton, OH (US)

( * ) Notice: Subject to any disclaimer, the term of this patent is extended or adjusted under 35 U.S.C. 154(b) by 354 days.

(21) Appl. No.: 11/317,926

(22) Filed: Dec. 23, 2005

(65) Prior Publication Data
US 2007/0150447 A1 Jun. 28, 2007

(51) Int. Cl.
*G06F 7/00* (2006.01)

(52) U.S. Cl. ........................ 707/809; 707/810

(58) Field of Classification Search ................ None
See application file for complete search history.

(56) References Cited

U.S. PATENT DOCUMENTS

| | | | |
|---|---|---|---|
| 5,692,175 A * | 11/1997 | Davies et al. ............... | 707/3 |
| 6,005,643 A | 12/1999 | Morimoto et al. | |
| 6,490,590 B1 | 12/2002 | Fink | |
| 6,512,835 B1 | 1/2003 | Numao et al. | |
| 6,678,681 B1 | 1/2004 | Brin | |
| 6,732,102 B1 | 5/2004 | Khandekar | |
| 7,124,140 B2 * | 10/2006 | Barton ......................... | 707/101 |
| 7,149,746 B2 * | 12/2006 | Fagin et al. ................. | 707/102 |
| 7,181,435 B2 * | 2/2007 | Cambot et al. .............. | 707/1 |
| 2002/0107842 A1 * | 8/2002 | Biebesheimer et al. ...... | 707/3 |
| 2003/0182283 A1 | 9/2003 | Bean et al. | |
| 2003/0217069 A1 * | 11/2003 | Fagin et al. ................. | 707/102 |
| 2005/0160087 A1 | 7/2005 | Nishigaki | |
| 2007/0112727 A1 * | 5/2007 | Jardine et al. ............... | 707/3 |

OTHER PUBLICATIONS

Author: Rob Hawthorne; Title: Microsoft SQL Server 2000 Database Development from Scratch;Date:Jan. 10, 2001;Publisher:Que;Pertinent pp. 1-11(re-numbered as in attached pdf).*

Author: Ken Henderson; Title: The Guru's Guide to Transact-SQL;Date:Feb. 23, 2000;Publisher:Addison-Wesley Professional;Pertinent pp. 1-21(re-numbered as attached in pdf).*

* cited by examiner

*Primary Examiner*—Tim T. Vo
*Assistant Examiner*—Anh Tai V Tran
(74) *Attorney, Agent, or Firm*—Schwegman, Lundberg & Woessner

(57) ABSTRACT

Techniques are presented for generic data extraction. Metadata defines a data extraction element with reference to an identifier, a data source, and one or more rules. The metadata may be processed to populate the data extraction element when a reference is made within a data template to the identifier. The identifier may be used to import data to a template or to export data to a different template or service.

6 Claims, 6 Drawing Sheets

CRM: EXTRACT FORMAT

Extract Format:
New Extract Format

Extract Format:
New Extract Format
ID: 3133456
Version: 1
Reference ID:

Status: Published
☐ Globally Available
☐ Notify me when modified

Modified: Leo Lang 5/28/04 1:15 pm
Created: Leo Lang 5/28/04 1:15 pm

Name [New Extract Format]

Description

☑ Use Outer Joins (include if no data)

Elements

| Name | Type | Source | Data Type | Sort | Sort Direction |
|---|---|---|---|---|---|
| ☐ First Name | Table/Field | CUSTDATA: INDIVIDUAL_MASTER.FirstName | VarChar | Yes | Asc |
| ☐ Last Name | Table/Field | CUSTDATA: INDIVIDUAL_MASTER.LastName | VarChar | Yes | Asc |
| ☐ E-mail Address | Table/Field | CUSTDATA: INDIVIDUAL_MASTER.EmailAddress | VarChar | No | N/A |
| ☐ Phone Number | Table/Field | CUSTDATA: INDIVIDUAL_MASTER.PhoneNumber | VarChar | No | N/A |

FIG. 4

EXTRACT FORMAT ELEMENT

Name: [Email Address]

Description:

Type: Table/Field ▶
Source: CUSTDATA: INDIVIDUAL_MASTER: EMAIL_ADDRESS ⋯
Data Type: Character ▶
Length: [100]
Decimal Places: [ ]
Mask: None ▶
Default Value: [ ]
Sort: ☑  Sort Direction: Ascending ▶

[Cancel] [OK]

TECHNIQUES FOR GENERIC DATA EXTRACTION

COPYRIGHT

A portion of the disclosure of this document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software, data, and/or screenshots which may be described below and in the drawings that form a part of this document: Copyright© 2005, NCR Corp. All Rights Reserved.

FIELD

The invention relates generally to data processing and more particularly to techniques for generic data extraction.

BACKGROUND

Enterprises continue to amass large amounts of data related to their business, their employees, their partners, and their customers. The data may reside in similar or disparate databases or similar or disparate storage locations. Furthermore, the data may be accessed for a variety of reasons, in a variety of permutations, and by a variety of resources within the enterprises.

Often the data is acquired via database search queries. Each time the same data is accessed for some desired purpose, an existing query or an entirely new query is reconstructed for purposes of acquiring that data. This does not facilitate efficient reuse within the enterprise and does not facilitate ease of use, since accessing the data still requires knowledge about the structure of the data source that contains the desired data.

That is, business analysts cannot reference desired data as a logical piece of information; rather, the business analyst must have some knowledge about the data source and the structure of that data source if the analyst expects to construct a query to acquire the desired data from the data source. Consequently, business analysts must also be somewhat skilled in database languages and interfaces and must have some training in the structure of data, if they expect to independently acquire their desired data without technical assistance.

This is not efficient and is not necessary, since business analysts should be skilled and trained in the business operations and not necessarily in database management, which should be reserved for highly trained technical staff.

Thus, it can be seen that improved techniques for data acquisition from data sources are desirable.

SUMMARY

In various embodiments, techniques for generic data extraction are provided. In an embodiment, an identifier for a data extraction element is received and a data source for populating the data extraction element is acquired. Next, one or more rules are established for populating the data extraction element. Moreover, the identifier, the data source, and the one or more rules are associated with one another as metadata that generically defines the data extracting element.

BRIEF DESCRIPTION OF THE DRAWINGS

FIG. 4 is an example GUI for illustrating data extraction formats, according to an example embodiment.

FIG. 5 is an example GUI for defining a data extraction element, according to an example embodiment.

FIG. 6 is another example GUI for defining a data extraction element, according to an example embodiment.

DETAILED DESCRIPTION

Figure 1:
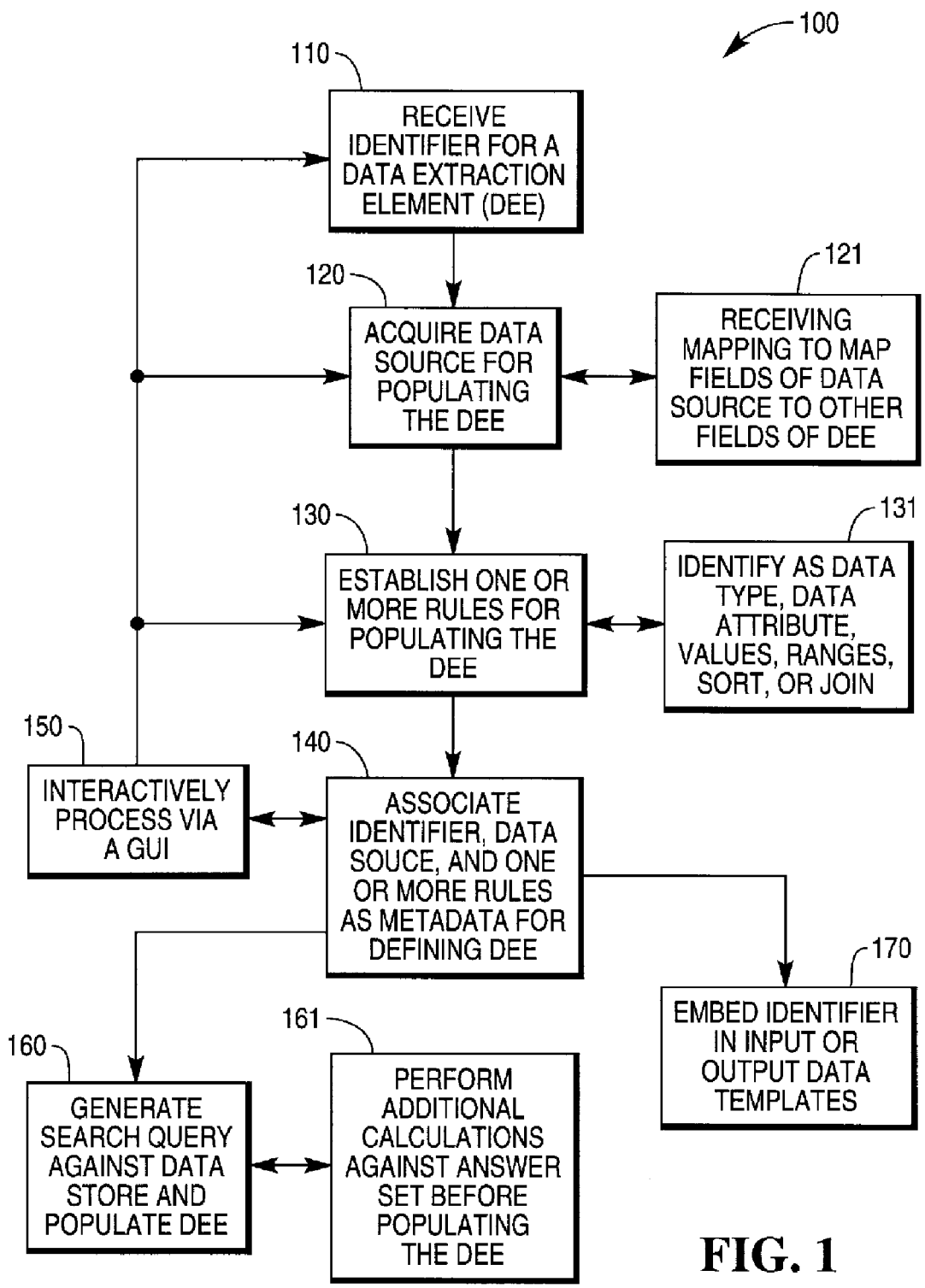
FIG. 1 is a diagram of a method for defining a generic data extraction element, according to an example embodiment.

FIG. 1 is a diagram of a method 100 for defining a generic data extraction element, according to an example embodiment. The method 100 (hereinafter "data extraction service") is implemented in a machine-accessible or computer-readable medium and is accessible over a network. The network may be wired, wireless, or a combination of wired and wireless.

A "data store" as used herein may include a database, a collection of databases organized as a data warehouse, a directory, a collection of directories cooperating with one another, or various combinations of the same. According to an embodiment, the data store is a Teradata® warehouse product or service distributed by NCR Corporation of Dayton, Ohio.

A "data extraction element" may be viewed as a data structure or a schema for a collection of data assembled from data sources. The data extraction element may be housed in memory, in storage, in a data store, or in various combinations of the same. The data, which populates the data extraction element, is logically associated in some manner as a single concept or logical unit.

For example, customer electronic mail (email) addresses are logically associated with one concept email but the collection of emails may be assembled from a specific data store field. The ability to reference the email as a cohesive and logical unit independent of the data source and its structure is what the data extraction element facilitates, as will be discussed more completely herein and below.

Within this context, the processing of the data extraction service is now discussed with reference to the FIG. 1. At 110, the data extraction service receives an identifier for a data extraction element. The identifier may be viewed as a name, which uniquely identifies the data extraction element to the exclusion of other different data extraction elements. The identifier may also include descriptive and related information that permits a user or analyst to readily ascertain contents of data that may be associated with a data extraction element.

At 120, the data extraction service acquires a data source, which is to be associated with the identifier of the data extraction element and which is used to acquire data that populates the data extraction element. According to an embodiment, at 121, the data extraction service may also receive a mapping of fields within the data source that map to corresponding fields within the data extraction element or map to a schema associated with the data extraction element. So, the data extraction element may be more than a single field from a data source, or a collection of fields from a variety of same or different data stores, which are mapped to a schema associated with the data extraction element.

At 130, the data extraction service establishes one or more rules for populating the data extraction element. The rules may define a variety of processing or attributes, which are used to assemble, collect, and organize the data that populates the data extraction element.

For example, at 131, the data extraction service may identify a rule that defines a data type for a data extraction element, such as a character, an integer, etc. A rule may also identify a data attribute, such as currency, decimal, date, etc. Additionally, a default data value may be defined within a rule or a default permissible range of data values may be defined within a rule. Still further, a rule may define a type of sorting to perform on data that is used to populate the data extraction element, such as, but not limited to, ascending order, descending order, and the like.

Moreover, a join attribute may be defined within a rule, the join attribute may establish whether a particular record that has no value for a given field defined within the data extraction element should be included or excluded from the populated data extraction element. For example, consider a data extraction element associated with an email for customers and suppose that the data source includes some customers that do not have emails or have null values for the email field. In such situations, a join or "use outer join" attribute or rule that is selected or defined for the data extraction element will permit customers with null email values to still populate the data extraction element. If the "use outer join" is not selected or activated, then such customers would be excluded from any populated data extraction element.

In fact, a variety of custom rules may be used and associated with the data extraction element. The above example rules and associated attributes were presented for purposes of illustration and were not intended to limit the scope of embodiments presented herein.

At 140, the data extraction service associates the identifier, the data source, and the one or more rules as metadata, which defines the data extraction element. That is, the identifier may be used to reference the data extraction element whereas the data source and the rules may be accessed and processed to populate the data extraction element when a reference to the identifier is encountered.

According to an embodiment, at 150, the data extraction service may interactively process 110-140 via a graphical user interface (GUI) that a user interacts with. So, an analyst may use a GUI to define the identifier, the data source, and the one or more rules. This combined information is then populated as metadata and used to define the data extraction element as communicated by the analyst via the GUI.

An example, GUIs for defining a data extraction format and a data extraction element are presented and discussed below with respect to FIGS. 4, 5, and 6.

In an embodiment, at 160, the data extraction service may subsequently generate a search query to process against the data store and to populate the data extraction element in response to the processing of the one or more rules included within the metadata.

In some cases, at 161, the answer set, which is returned from the search query that executes against the data store, may have additional rules processed to perform additional calculations on the answer set data before the data extraction element is populated.

So, the actual populated data extraction element may include fields from a data store table or view, measures that are calculated from columns of data store tables, selection variables (additional attribute that may be returned from a segment based on any source variable), static text (constant string that does not change), and/or scores (values that are generated by formulas).

The rules defined in the metadata of the data extraction element instruct the data extraction service or other subsequent services on how to properly construct, acquire, and organize data to populate the data extraction element. Again, the populated data may be a single type of data or a variety of multiple types of different data logically mapped to a schema associated with the data extraction element.

In an embodiment, at 170, the data extraction service may embed the identifier in an input or output data template. That is, reference to the identifier permits subsequent services to acquire the metadata and construct and populate the data extraction element. So, the identifier may be embedded as input within an input data template. Alternatively, the identifier may be embedded as output within an output data template, such that the populated data extraction element is passed as output to another service or template.

The identifier may be indexed within the data store and may include descriptive information. In this manner, analysts and users may share, reuse, and leverage the data extraction element within an enterprise. Still further, analysts do not have to be skilled in data source formats, structures, or database query languages; rather, if the analysts understand the general and generic description of the data extraction element, then the analysts may effectively utilize the identifier of the data extraction element to extract and populate templates with data associated with the data extraction element. Thus, no knowledge of the underlying data model is needed by analysts or users to utilize the teachings presented herein.

Figure 2:
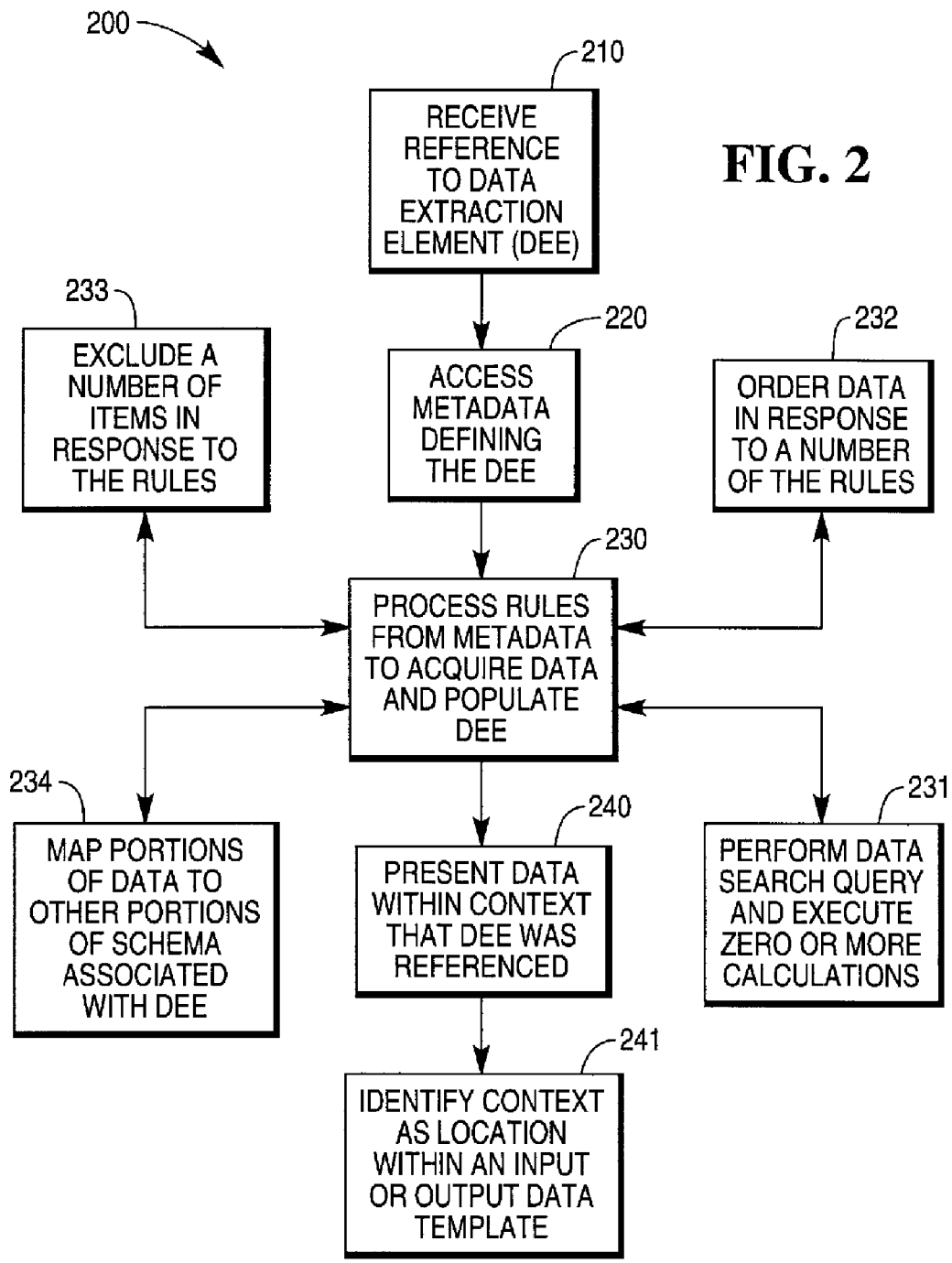
FIG. 2 is a diagram of a method for processing references to a generic data extraction element, according to an example embodiment.

FIG. 2 is a diagram of a method 200 for processing references to a generic data extraction element, according to an example embodiment. The method 200 (hereinafter "data population service") is implemented in a machine-accessible and readable medium and is accessible over a network. The network may be wired, wireless, or a combination of wired and wireless.

The data extraction service represented by the method 100 of the FIG. 1 depicts processing associated with defining a generic data extraction element whereas the data population service depicted in FIG. 2 illustrates processing associated with populating a generic data extraction element when a reference to it is encountered.

At 210, the data population service receives a reference to a data extraction element. In an embodiment, the reference is the identifier discussed above with respect to the metadata that defines the data extraction element for the data extraction service, which is represented by the method 100 of the FIG. 1. Essentially, the reference uniquely identifies a particular data extraction element and permits the data population service to locate metadata that defines the data extraction element.

Accordingly, at 220, the data population service uses the reference to acquire the metadata. The metadata includes rules and the rules may include attributes. At 230, the data population service processes the rules included in the metadata for purposes of acquiring data and populating that data to the data extraction element.

According to an embodiment, at 231, the rules may necessitate that the data population service performs a data search query against a data source and then perform zero or more additional calculations. Thus, the final populated data may be an answer set associated with the search query or may be a result that reflects some manipulation and calculation against the answer set, such as measures, scores, etc.

In yet another embodiment, at 232, the data population service may use a number of rules to order or sort the data within the populated data extraction element. Any variety of answer set ranking or ordering may be used to put the data of the data extraction element in a format and order defined or dictated by the rules. For example, a rule may state that a date field be sorted in ascending order to organize records associated with a data extraction element.

In another instance, at 233, a number of items or records that may be initially returned as being associated with the data extraction element may also be excluded pursuant to rules. So, if a field includes a null value, which is deemed significant to the overall understanding of the data extraction element, then this entire record may be excluded from the populated data extraction element. Conversely, such null record values may be actively maintained within the populated data extraction element. An example of these situations was provided above with respect to the data extraction service represented by the method 100 of the FIG. 1 and with reference to the "use outer join" attribute used within the metadata that defines the data extraction element.

According to an embodiment, at 234, the data population service may also map portions of data acquired to populate the data extraction element to schema elements associated with a schema of the data extraction element. So, as an example, consider data acquired that has a field identified as date of purchase and suppose further that the data extraction element includes a schema element defined as date. If a proper rule associates the date of purchase with the schema element date, then the data population service may map the values included within the data for the date of purchase with the corresponding date schema element for the data extraction element.

An example GUI that permits a user to interactively provide a mapping, which can be used to create a corresponding mapping rule for the data population service, is presented and discussed herein and below with respect to the FIG. 6.

At 240, the populated data is presented and provided within the context within which the data extraction element was referenced. So, if a form or template provided the reference to the data extraction element, then the data population service populates the data to the form or template in the proper location within the form or template. As another example, if the reference was supplied to a subsequent service as a reference to a table, the reference when supplied to that subsequent service will now point to a populated table have the data associated with the data extraction element.

In an embodiment, at 241, the data population service may identify the context as a specific location within an input or output data template. The location may be populated with the data of the data extraction element or with a reference to a structure that refers to the populated data extraction element.

One now appreciates with the discussion of the data extraction service represented by the method 100 of the FIG. 1 how a generic data extraction element may be initially defined and then referenced in a logical manner for subsequent use. The processing of that reference is transparent to an analyst or user and is depicted with the data population service, which represents the method 200 of the FIG. 2.

Essentially, knowledge about the data model of the data store for a data extraction element is abstracted and the details are hidden from users whom utilize the processing of the data population service. Moreover, the definition to initially establish the data extraction element can be achieved at a high and generic level of understanding through the use of GUI's and the processing associated with the data extraction service (method 100).

Figure 3:
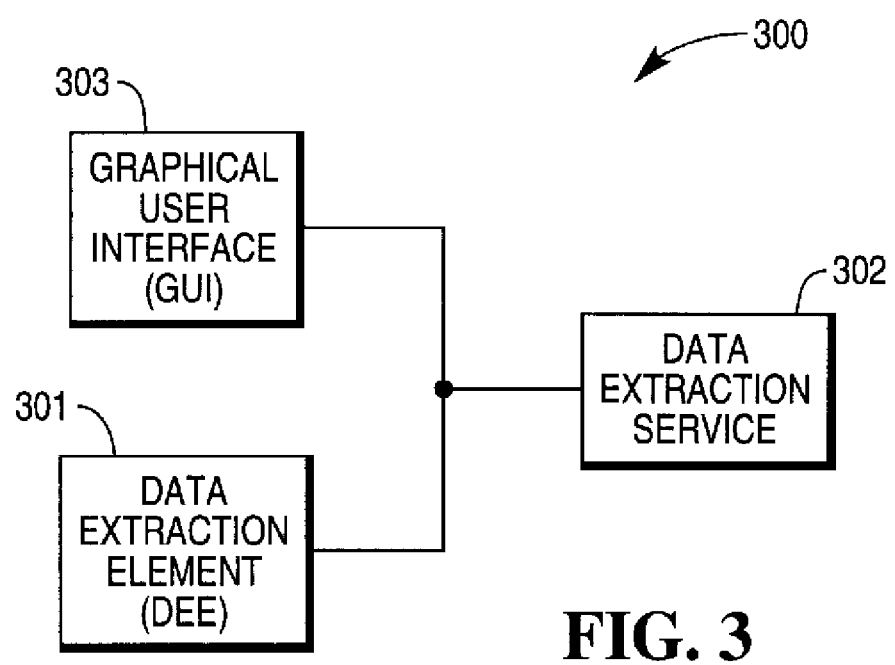
FIG. 3 is a diagram of a data extraction system, according to an example embodiment.

FIG. 3 is a diagram of a data extraction system 300, according to an example embodiment. The data extraction system 300 is implemented in a machine-accessible and readable medium and is operational over a network. The network may be wired, wireless, or a combination of wired and wireless. In an embodiment, portions of the data extraction system 300 implements, among other things the services represented by the methods 100 and 200 of the FIGS. 1 and 2, respectively.

The data extraction system 300 includes a data extraction element 301 and a data extraction service 302. In some embodiments, the data extraction system 300 may also include a GUI 303. Each of these will now be discussed in turn.

The data extraction element 301 is a data structure or table that may be defined by metadata, which itself may include a schema. The metadata includes a unique identifier for referencing the data extraction element 301, one or more data sources that may be used to acquire data to populate the data extraction element 301, and one or more rules for acquiring the data and for filtering, calculating, and/or organizing the data within the data extraction element 301.

The rules within the metadata may include a data store query, a calculation, a constant string reference, a sorting algorithm, a formula associated with scoring the data, and the like. The rules may also identify attributes for the data, such as currency, date, etc.

Examples of initially defining the data extraction element 301 were provided above with respect to the method 100 of the FIG. 1.

The data extraction service 302 is used to both define the data extraction element 301 and to populate the data extraction element 301 when references are made to the data extraction element 301 from within data templates. In this sense, the data extraction service 302 of the data extraction system 300 may be viewed as performing the processing of both the methods 100 and 200 of FIGS. 1 and 2. The output of the data extraction service 302 is the data extraction element 301 and the subsequent population of that data extraction element 301 is also managed and handled by the data extraction service 302.

According to an embodiment, the data extraction service 302 is automatically invoked by a service that processes a data template having a reference to the data extraction element 301. Therefore, the data extraction service 302 may provide a service to another service, such as a browser, and acquire and populate a web page with data associated with the data extraction element 301.

The data template may be associated with importing the data of the data extraction element 301. Alternatively, the data template may be associated with exporting the data of the data extraction element 301 to another service or template.

In an embodiment, the data extraction system 300 also includes a GUI 303. The GUI interacts and receives values and selections from an analyst and communicates with the data extraction service 302 for purposes of defining the metadata of the data extraction element 301. So, the GUI includes input or selection fields within a menu driven form, which the analyst may use to supply an identifier, one or more data sources for acquiring data associated with the data extraction element 301, and rules associated with population and perhaps organizing the data within the data extraction element 301. An example GUI 303 for achieving this is presented below with respect to the FIG. 5.

The GUI 303 may also be used to map fields within the data acquired from the data sources to specific schema elements associated with the data extraction element 301. Examples for mapping fields to schema elements of the data extraction element 301 are presented below with respect to the FIG. 6.

FIG. 4 is an example GUI for illustrating data extraction formats, according to an example embodiment. In FIG. 4, data extraction format may be defined and a description provided. The named data extraction format and description may then be further expanded in FIG. 5 with more specific details for a data extraction element. FIG. 4 shows that existing data extraction elements may be selected as initial templates for any new data extraction element being defined. Other attributes may be added to the new data extraction format as well, such as globally published and tracking attributes to notify the creator when modifications occur to the new data extraction element. Again, the data extraction format and its initial information may be further interactively refined with the GUI presented in FIG. 5 below.

FIG. 5 is an example GUI for defining a data extraction element, according to an example embodiment. In FIG. 5 the GUI includes a field for receiving an identifier from an analyst or user. That identifier in the example presented is "Email Address."

The rules associated with the data extraction element are then presented in other selection fields, input fields, and/or drop down menu fields. For example, a data attribute rule for data type is defined as "Character."

The data source from which the data is acquired to populate the data extraction element is identified in a source field having a browsing option identified to the right of the identified "CUSTDATA:INDIVIDUAL_MASTER:EMAIL_AD-DRESS," which identifies the specific data source for acquiring the email addresses for the data exchange element.

Other attributes and rules are presented, such as maximum length of the email set at 100. A default value that is unset and a sort field that is checked and identified as sorting in ascending order.

The GUI of FIG. 5 presents one example of how a data model may be abstracted and presented for purposes of interacting with an analyst and acquiring an initial definition and metadata for a desired data exchange element.

Figure 6:
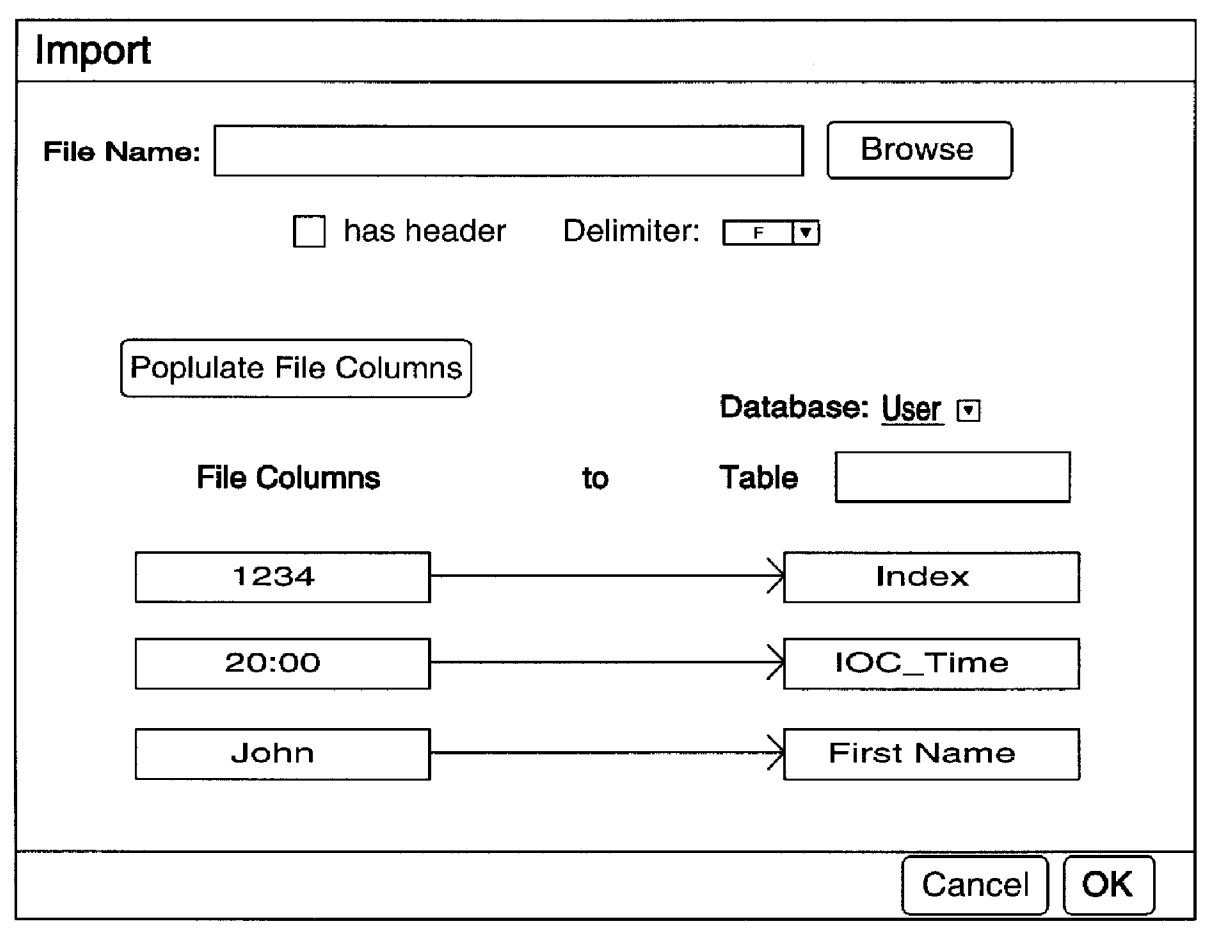

FIG. 6 is another example GUI for defining a data extraction element, according to an example embodiment. In FIG. 6 a specific data source may be mapped to schema elements associated with a data exchange element. So the file name field is used for the data source that is to be imported into the data exchange element, the file columns on the left correspond to fields within the file name and the table columns on the right correspond to schema elements associated with the data exchange element.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method implemented in a computer-readable medium and to process on a computer for performing the method, comprising:

receiving an identifier for a data extraction element;

acquiring data sources for populating the data extraction element, the data sources are different from one another;

establishing one or more rules; and associating the identifier, the data sources, and the one or more rules as metadata for defining the data extraction element, the metadata is a schema that includes the identifier for referencing the data extraction element, an identifier for the data sources;

using the rules for acquiring, filtering, calculating, and organizing data that populates the data extraction element within that data extraction element, and each of the rules include a data store query for acquiring the data, a calculation for performing the calculating against the data, a sorting algorithm for organizing the data, a permissible range of data values for the data, a default data value for the data values, a type of sorting to perform on the data values, a data attribute, and a formula for scoring the data within the data extraction element, the type of sorting defines an ascending order or descending order;

processing the metadata when references are made to the data extraction element within data templates;

indexing the identifier within a database along with descriptive information;

sharing the data extraction element via the indexed identifier along with the descriptive information within the database;

making the data extraction element is accessible via the identifier from the database or the data templates as a cohesive unit that is independent of the data sources and the their structures; and establishing at least one rule to define a join attribute, the join attribute determines whether a particular record that has no value for a given field defined within the data extraction element is to be included or excluded from the populated data extraction element.

2. The method of claim 1 further comprising, interactively processing the method via a graphical user interface (GUI) tool.

3. The method of claim 1, wherein acquiring further includes receiving a mapping that maps one or more fields of the data sources with one or more additional fields to be associated with the data extraction element via specific schema elements of the schema.

4. The method of claim 1 further comprising:

generating a search query that conforms to the one or more rules; and populating the data extraction element using additional ones of the one or more rules and an answer set returned in response to executing the search query.

5. The method of claim 1 further comprising: embedding the identifier in the data templates.

6. The method of claim 4 further comprising: performing additional calculations against the answer set before populating the data extraction element.

* * * * *